Patented July 24, 1934

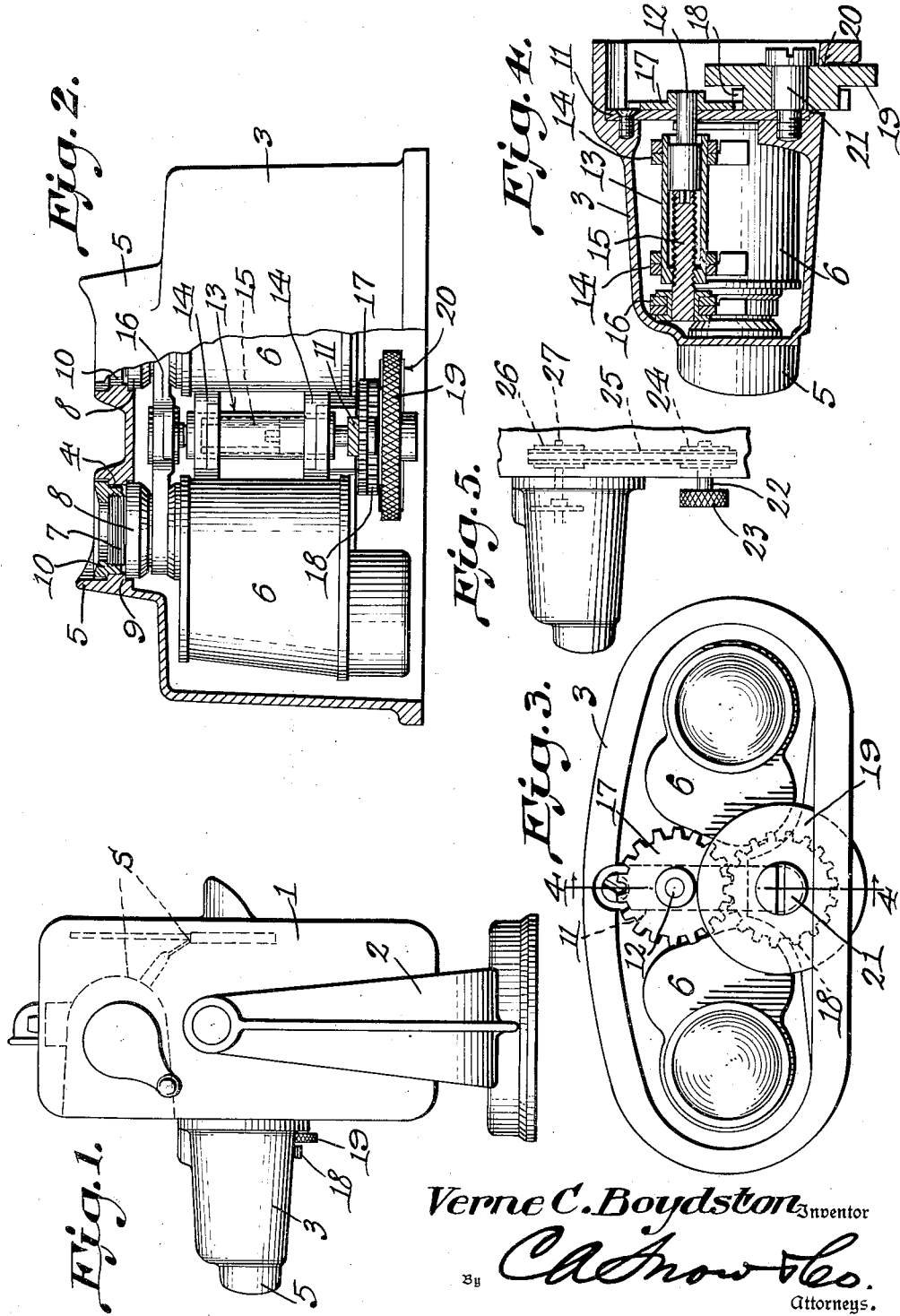

1,967,738

UNITED STATES PATENT OFFICE 1,967,738

BINOCULAR

Verne C. Boydston, Seattle, Wash., assignor to Globe Binocular Corporation, Seattle, Wash.

Application November 10, 1932, Serial No. 642,111

6 Claims. (Cl. 88—34)

This invention relates to binoculars of the type controlled by coins or checks, and is more especially an improvement in the means for focusing the lenses.

For the purpose of protecting the binoculars from unauthorized handling it is necessary to house them in protective box-like casings. Each of these has openings through which the user looks into the binocular after depositing a coin and shifting a shutter or the like which normally obscures the vision. It is of course necessary then to focus the binocular to meet the requirements of the user.

Heretofore the required adjustment has been effected by moving the eye pieces of the binocular toward and from the object lenses but where the binocular has been supported in a protecting housing or casing this has resulted in moving the eye pieces toward or from the sight openings in the casing with a resultant objectionable variation in the field of vision.

It is an object of the present invention to so mount the binocular that the eye pieces will remain fixed in relation to the sight openings, the adjustment of the focus being effected by moving the object lenses relative to the eye pieces, thereby maintaining the correct distance between the eye pieces and the eyes of the user and consequently preserving the desired field of vision.

It is a further object to completely enclose the binocular in a protecting housing so shaped and mounted as to allow the face of the user to be brought close thereto without inconvenience or discomfort when it is desired to use the device.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawing the preferred forms of the invention have been shown.

In said drawing:

Figure 1 is a side elevation of the complete coin-controlled binocular having the present improvements.

Figure 2 is an enlarged plan view of the binocular casing detached, a portion being in section.

Figure 3 is an elevation of the open end of the binocular casing.

Figure 4 is a section on line 4—4, Figure 3.

Figure 5 is a side elevation of a portion of a modified structure.

Referring to the figures by characters of reference, 1 designates a main casing mounted on a suitable support 2 and containing a coin-controlled shutter mechanism shown generally at S. As this mechanism constitutes no part of the present invention but is disclosed in my copending application herein mentioned, it is not deemed necessary to show or describe it in detail. It is only necessary to state that the casing has openings in its back face alined with the object lenses of a binocular within the structure and a shutter, which is coin controlled, is interposed normally between said lenses and openings so as to shut off the view through the device.

The present invention includes a housing 3 formed on or secured to the front face of casing 1 and opening thereinto. This can be tapered toward its free end as shown or can be of other design. Sight openings 4 are formed in the front end and can have shields 5 at the sides thereof. By employing a projecting housing with sight openings and shields the user can stand close to the device without inconvenience and hold the face close against the end of the housing where the eyes can look into the sight openings and the side light can practically be excluded.

The main sections of a binocular have been indicated at 6 and the eye-pieces 7 thereof are secured in the sight openings 4 in any suitable manner. For example the barrels 8 of the eye-pieces can be fitted on seats 9 provided therefor and can be held thereagainst by rings 10 seated in the outer portions of the sight openings and threaded onto the barrels 8 so as to bind them fixedly upon their seats 9.

A bearing plate 11 is secured across the casing 3 at the center thereof and near its back or open end. It provides a bearing for a short shaft 12 rotatably and slidably mounted in a tube or hollow hinge pin 13 carried by the connecting members 14 of the binocular. One end of this shaft is coupled detachably to one end of a feed screw 15 which is threaded through one end of tube 13 and is swiveled in a stationary cross head 16 fixedly secured to the barrels 9.

A gear 17 is secured to and rotates with shaft 12 and constantly meshes with an operating gear 18. This gear is connected to or formed with a milled or knurled thumbwheel 19 a portion of which extends through a slot 20 in the housing 3 where it can be reached readily for turning. The screw stud 21 which provides a bearing for wheel 20 and gear 19 can also be used to fasten one end of plate 11 in position.

It will be obvious that by actuating the wheel 19 and gear 18 the gear 17 will be rotated. This will rotate shaft 12 and screw 15 and cause the hinge pin or tube 13 to move therealong, carrying with it all portions of the binocular except the barrels 8. Thus the device can be focused to meet the requirements without changing the positions of the eye-pieces relative to the sight openings 4 and the eyes of the user.

Obvious means other than those described can be used for shifting the binocular relative to its anchored barrels. For example, instead of operating the screw by gears, a small shaft 22 can be extended from the casing 1 and provided at its outer end with a knob 23 for use in rotating the shaft. The inner portion of the shaft can carry a sprocket 24 for transmitting motion through a chain 25 to a sprocket 26 on shaft 27. This latter shaft corresponds with shaft 12.

The main casing 1 and the housing 3 cooperate to form an enclosure for the main sections 6 of the telescope and their connections so that access to said main members and connections is prevented while the binocular telescope is in use.

What is claimed is:

1. In a device of the class described a casing, a projecting housing on and opening into the casing, said housing having sight openings, a binocular telescope enclosed in the housing and having eye pieces and barrels fixedly seated in said openings, and means operable from outside the housing for shifting the remaining portion of the binocular telescope relative to the fixed barrels and eye-pieces to focus the telescope.

2. In a device of the class set forth, a housing having sight openings, a binocular telescope enclosed in the housing and having its eye pieces and barrels fixed in alinement with said openings, an adjusting device outside of the housing, and means operated thereby for shifting all portions of the binocular telescope except the barrels and eye-pieces to change the focus, said means including a hollow hinge pin interposed between and movable with the main members of the binocular telescope, an anchored screw engaged by and rotatable in said pin, and a driving connection between the screw and the adjusting device.

3. In a device of the class set forth, a housing having sight openings, a binocular telescope enclosed in the housing and having its eye pieces and barrels fixed in alinement with said openings, an adjusting device outside of the housing, and means operated thereby for shifting all portions of the binocular telescope except the barrels and eye-pieces to change the focus, said means including a hollow hinge pin interposed between and movable with the main members of the telescope, an anchored screw engaged by and rotatable in said pin, and a gear connection between said screw and the adjusting device.

4. In a device of the class set forth, a housing having sight openings, a binocular telescope enclosed in the housing and having its eye pieces and barrels fixed in alinement with said openings, an adjusting device outside of the housing, and means operated thereby for shifting all portions of the binocular telescope except the barrels and eye-pieces to change the focus, said means including a hollow hinge pin interposed between and movable with the main members of the telescope, an anchored screw engaged by and rotatable in said pin, and a chain and sprocket connection between said screw and the adjusting device.

5. In a device of the class described a housing having sight openings, a binocular telescope enclosed therein having its barrels and eye pieces fixed in the openings and its object lens-carrying sections slidable on the barrels, a rotatable adjusting screw anchored to the barrels, means movable with said sections for engagement by the screw, and means operated from outside the housing for rotating the screw to shift said sections on the barrels to focus the binocular telescope without changing the positions of the eye pieces relative to the sight openings.

6. A device of the class described including a rigid casing, a housing fixedly supported thereon and extending therefrom for contact with the face of the user close to the eyes, there being a sight opening in said housing, a telescope within the housing in fixed alinement with the sight opening, coin controlled shutter mechanism within the casing, said housing and casing cooperating to prevent access to the telescope and to the coin controlled shutter mechanism while in use.

VERNE C. BOYDSTON.